(12) United States Patent
Marru

(10) Patent No.: US 12,339,510 B2
(45) Date of Patent: Jun. 24, 2025

(54) FIRE RETARDANT STRENGTH MEMBER FOR OPTICAL FIBER CABLES AND MANUFACTURING METHOD THEREOF

(71) Applicant: Sterlite Technologies Limited, Gurugram (IN)

(72) Inventor: Pramod Marru, Gurugram (IN)

(*) Notice: Subject to any disclaimer, the term of this patent is extended or adjusted under 35 U.S.C. 154(b) by 665 days.

(21) Appl. No.: 17/697,640

(22) Filed: Mar. 17, 2022

(65) Prior Publication Data

US 2023/0204887 A1 Jun. 29, 2023

(30) Foreign Application Priority Data

Dec. 28, 2021 (IN) ................................ 202111061171

(51) Int. Cl.
  G02B 6/44 (2006.01)
(52) U.S. Cl.
  CPC .................................. *G02B 6/4436* (2013.01)
(58) Field of Classification Search
  CPC .................................................... G02B 6/4436
  See application file for complete search history.

(56) References Cited

U.S. PATENT DOCUMENTS

| | | | | |
|---|---|---|---|---|
| 9,728,302 B1* | 8/2017 | McNutt | ................ | G02B 6/4436 |
| 2003/0118296 A1* | 6/2003 | Smith | ................ | G02B 6/4432 |
| | | | | 385/102 |
| 2011/0293228 A1* | 12/2011 | Keller | ................ | G02B 6/4486 |
| | | | | 385/103 |
| 2015/0197633 A1* | 7/2015 | van der Mee | ........... | C08K 7/14 |
| | | | | 524/537 |
| 2015/0268430 A1* | 9/2015 | Bringuier | ............... | G02B 6/443 |
| | | | | 385/113 |
| 2018/0358794 A1* | 12/2018 | Parke | ................... | H02G 1/1287 |

FOREIGN PATENT DOCUMENTS

WO  WO-2017100762 A1 *  6/2017  ............. B60M 1/22

* cited by examiner

*Primary Examiner* — Uyen Chau N Le
*Assistant Examiner* — Hoang Q Tran
(74) *Attorney, Agent, or Firm* — Steven R. Fairchild; Arun Narasani

(57) ABSTRACT

A strength member (202, 302) for use in an optical fiber cable and manufacturing method thereof are provided. The strength member comprises a polymer matrix reinforced with one or more yarns, wherein the polymer matrix is a blend of a resin and an inorganic filler. The resin is a polyurethane resin and the inorganic filler is one or more of Magnesium Hydroxide, Aluminium Trihydrate, Zinc borate, Antimony Trioxide, Ammonium Polyphosphate, molybdate based filler and clay nanocomposite. The manufacturing method includes coating the one or more strength yarns with the polymer matrix and curing of the polymer matrix. The inorganic filler is blended in third wet bath of the resin followed by two wet baths of the resin only and the resin is cured after each wet bath. The strength member produces a smoke density of less than 170 at heat flux 50 kW/m$^2$ for 20 minutes.

15 Claims, 4 Drawing Sheets

FIRE RETARDANT STRENGTH MEMBER FOR OPTICAL FIBER CABLES AND MANUFACTURING METHOD THEREOF

TECHNICAL FIELD

The present disclosure relates to optical fiber cables, and in particular, relates to fire retardant strength member for optical fiber cables and manufacturing method thereof.

BACKGROUND

Optical fiber cables are a critical component of modern communication network across the globe. In order to qualify for particular application, such as indoor and/or outdoor applications, the optical fiber cables undergo stringent fire tests. Thus, cable elements that are highly combustible need to be replaced with fire retardant versions which are not/less combustible. A strength member is one such element which is combustible and can contribute to higher fire risks.

One way to address the aforesaid problem is to coat the strength member with fire retardant materials. A prior art reference "JP2009172995A" teaches coating strength members with a fire retardant resin. Similarly, another prior art reference "U.S. Pat. No. 8,625,947B1" discloses strength members (i.e., reinforcing materials) that include polymeric matrix materials. However, the materials used in the conventional strength member have a high smoke density and poor burn performance, which is not suitable for use in the optical fiber cables. Thus, there exists a need to overcome the above stated disadvantages/problems/limitations.

Any references to methods, apparatus or documents of the prior art are not to be taken as constituting any evidence or admission that they formed, or form part of the common general knowledge.

SUMMARY

A primary object of the present disclosure is to provide a fire retardant strength member for optical fiber cables and manufacturing method thereof, where the fire retardant strength member is made of a resin and an inorganic filler material.

Another object of the present disclosure is to provide an optical fiber cable with the fire retardant strength member.

Accordingly, a strength member for use in an optical fiber cable and manufacturing method thereof are provided. The strength member comprises a polymer matrix reinforced with one or more yarns, wherein the polymer matrix is a blend of a resin and an inorganic filler. The manufacturing method includes coating the one or more strength yarns with the polymer matrix and curing of the polymer matrix. The inorganic filler is blended in third wet bath of the resin followed by two wet baths of the resin only and the resin is cured after each wet bath. The resin is cured by ultraviolet radiation or heat radiation. The inorganic filler is one or more of Magnesium Hydroxide, Aluminium Trihydrate, Zinc borate, Antimony Trioxide, Ammonium Polyphosphate, molybdate based filler and clay nanocomposite and the resin is a polyurethane resin. The inorganic filler is blended with 1 to 100 phr (Parts per Hundred Resin) in the resin. Specifically, Magnesium Hydroxide and Aluminium Trihydrate are blended with a phr of 50 to 100 and Zinc borate, Antimony Trioxide, Ammonium Polyphosphate, molybdate based filler and clay nanocomposite are blended with a phr of 1 to 10 in the resin. The resin has a viscosity less than or equal to 200 mPa·s at 25° C. The inorganic filler has a particle size of greater than or equal to 0.25 micron and has a temperature of decomposition less than or equal to 700° C. The strength member produces a smoke density of less than 170 at heat flux 50 kW/m² for 20 minutes, has a total heat release of less than 80 MJ/m² at heat flux of 50 kW/m² and time of ignition for the strength member is up to 120 seconds at heat flux of 50 kW/m².

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

BRIEF DESCRIPTION OF FIGURE

The invention is illustrated in the accompanying drawings, throughout which like reference letters indicate corresponding parts in the drawings. The invention herein will be better understood from the following description with reference to the drawings, in which.

It should be noted that the accompanying figures are intended to present illustrations of few examples of the present disclosure. The figures are not intended to limit the scope of the present disclosure. It should also be noted that accompanying figures are not necessarily drawn to scale.

DETAILED DESCRIPTION

In the following detailed description of the invention, numerous specific details are set forth in order to provide a thorough understanding of the invention. However, it will be obvious to a person skilled in the art that the invention may be practiced with or without these specific details. In other instances, well known methods, procedures and components have not been described in details so as not to unnecessarily obscure aspects of the invention.

Furthermore, it will be clear that the invention is not limited to these alternatives only. Numerous modifications, changes, variations, substitutions and equivalents will be apparent to those skilled in the art, without parting from the scope of the invention.

The accompanying drawings are used to help easily understand various technical features and it should be understood that the alternatives presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Unlike conventional strength member that is made using epoxy based resins having a high smoke density of around 200 at heat flux 50 kW/m² for 20 minutes, the present disclosure proposes to make an optical fiber cable fire retardant by making strength members fire retardant. The proposed fire retardant strength member is made using polyurethane resin that has the smoke density less than 170. Use of the fire retardant strength member can facilitate use of low filled LSZH (Low Smoke Zero Halogen) jacket which enhances mechanical strength of the optical fiber cable.

Figure 1:
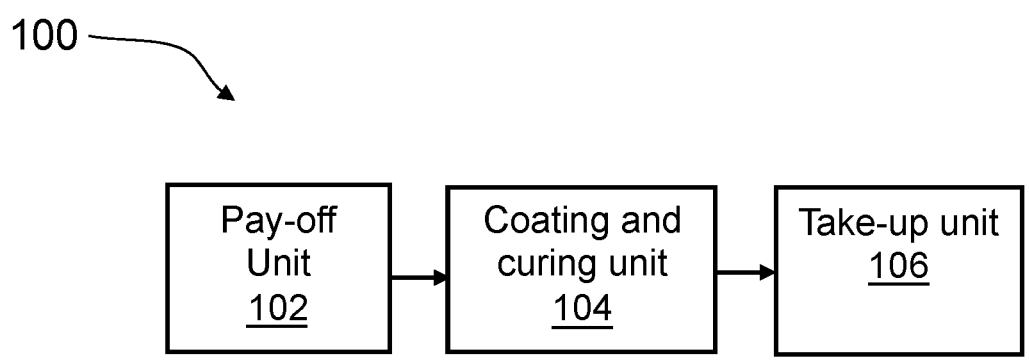
FIG. 1 illustrates a system for manufacturing a strength member.

FIG. 1 illustrates a system 100 for manufacturing a strength member. The system 100 may include a pay-off unit 102, a coating and curing unit 104 and a take-up unit 106. The pay-off unit 102 may be a rotating platform, vertical axis flyer type pay-off unit, horizontal axis flyer type pay-off unit, high speed pay-off unit, for example. The pay-off unit 102 is suitable to continually pay-off one or more strength yarns to the coating and curing unit 104. The one or more strength yarns may be one of aramid yarns, glass roving yarns or any suitable yarn known to a person skilled in fiber optic art.

The coating and curing unit 104 may include a suitably dimensioned die that is flooded with a polymer matrix material (interchangeably "polymer matrix") and may also include a forming and curing die for curing the polymer matrix coated one or more strength yarns. In other words, the coating and curing unit 104 may include a resin bath where the one or more strength yarns are coated with the polymer matrix (resin), which then passed through the forming and curing die where the one or more strength yarns are given a desired shape and are cured. Though the coating and curing unit 104 has been shown as a single unit, the same may be separate units without limiting the scope of the present disclosure.

The polymer matrix material is a blend of a resin and an inorganic filler. The resin may be, but not limited to, a polyurethane resin. The resin may have a viscosity less than or equal to 200 mPa·s at 25° C. Alternatively, the viscosity of the resin may vary. Further, the inorganic filler may be a fire retardant material. Such low viscosity of the resin supports higher dissolution of the inorganic filler that further enhances the fire retardancy. The inorganic filler may be, but not limited to, one or more of magnesium hydroxide, aluminium trihydrate, zinc borate, antimony trioxide, ammonium polyphosphate, molybdate based filler and clay nanocomposite. The inorganic filler may have a particle size of greater than or equal to 0.25 micron. Alternatively, the particle size of the inorganic filler may vary. The inorganic filler may have a temperature of decomposition less than or equal to 700° C. Alternatively, the temperature of decomposition of the inorganic filler may vary. In general, the temperature of decomposition (or decomposition temperature) of a substance is the temperature at which the substance chemically decomposes.

The coating and curing unit 104 may be configured to perform coating and curing of the one or more strength yarns. Initially, the one or more strength yarns may be bathed with the resin and then curing may be performed by the coating and curing unit 104. Typically, curing is a process that produces toughening or hardening of a material, such as polymer matrix/material by cross-linking of polymer chains. The resin may be cured using thermal/heat or UV (ultraviolet) curing. The above process of coating and curing may be repeated. That is, after a first round of bathing and curing, the coating and curing unit 104 may perform a second round of bathing using the resin and curing of the one or more strength yarns. Lastly, the coating and curing unit 104 may perform the curing followed by bathing of the bathed and cured one or more strength yarns with a blend of the resin and the inorganic filler. In all the steps, the bathing may be, but not limited to, wet bathing.

To sum up, the inorganic filler may be blended in third wet bath of the resin followed by two wet baths of the resin only and the resin may be cured after each wet bath, thereby resulting in the strength member as proposed by the present disclosure. In other words, after the first and second wet baths of resin and curing, the inorganic filler is blended with the resin in the third wet bath, thereby resulting in the strength member as proposed by the present disclosure. Alternatively, blending of the inorganic fillers in the resin may be done in the first wet bath, the second wet bath or any suitable combination of wet baths. The inorganic filler may be blended with 1 to 100 phr (Parts per Hundred Resin) in the resin, wherein Magnesium Hydroxide and Aluminium Trihydrate may be blended with a phr of 50 to 100 and Zinc borate, Antimony Trioxide, Ammonium Polyphosphate, molybdate based filler and clay nanocomposite may be blended with a phr of 1 to 10 in the resin. Alternatively, the value of phr may vary.

Lastly, the coated and cured strength member may be taken up by the take-up unit 106. Advantageously, the resultant strength member has high fire retardancy due to addition of the inorganic fillers without reducing the required tensile strength and stiffness.

The resultant strength member may be characterized by a smoke density, which determines the volume of smoke generated when cables are burned. The strength member may produce the smoke density of less than 170 at heat flux 50 kW/m² for 20 minutes. Alternatively, the smoke density may vary. The heat flux (aka thermal flux, heat flux density, heat-flow density or heat flow rate intensity) is a flow of energy per unit of area per unit of time. Further, time of ignition (time-to-ignition) for the resultant strength member may be up to 120 seconds at the heat flux of 50 kW/m². Alternatively, the time of ignition may vary. Time-to-ignition is an important fire reaction property because it defines how quickly flaming combustion of a material will occur when exposed to a heat source. Furthermore, the resultant strength member may have a total heat release of less than 80 MJ/m² at the heat flux of 50 kW/m². Alternatively, the total heat release of the strength member may vary. The total heat release defines the maximum release rate of heat during a combustion process.

Figure 2:
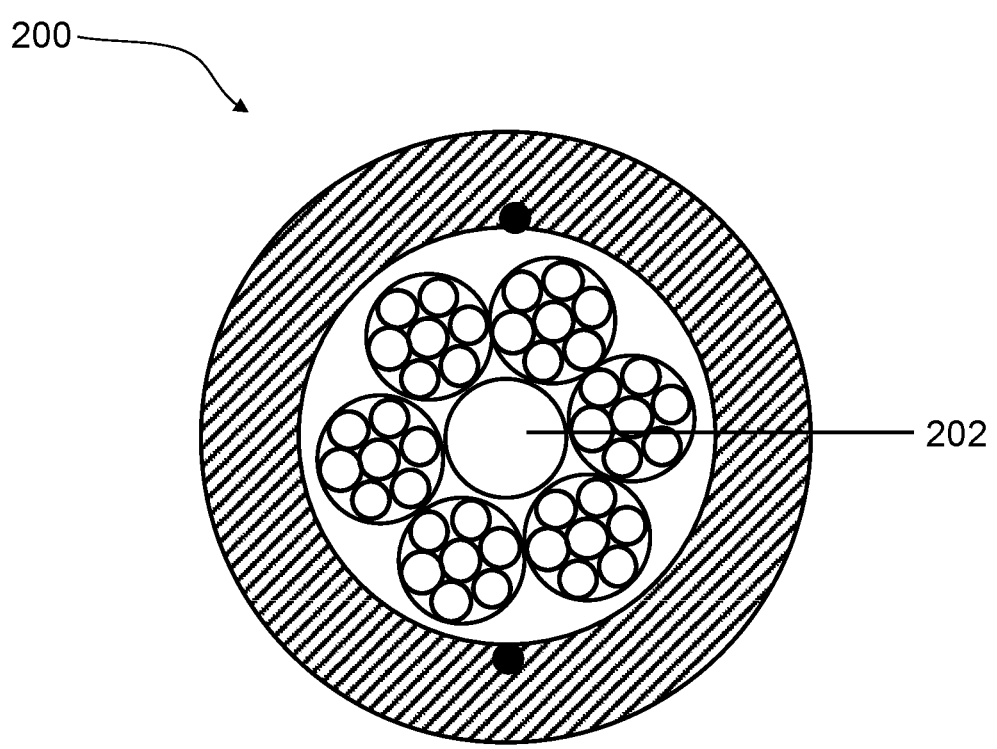
FIG. 2 illustrates an exemplary optical fiber cable with a central strength member.
Figure 3:
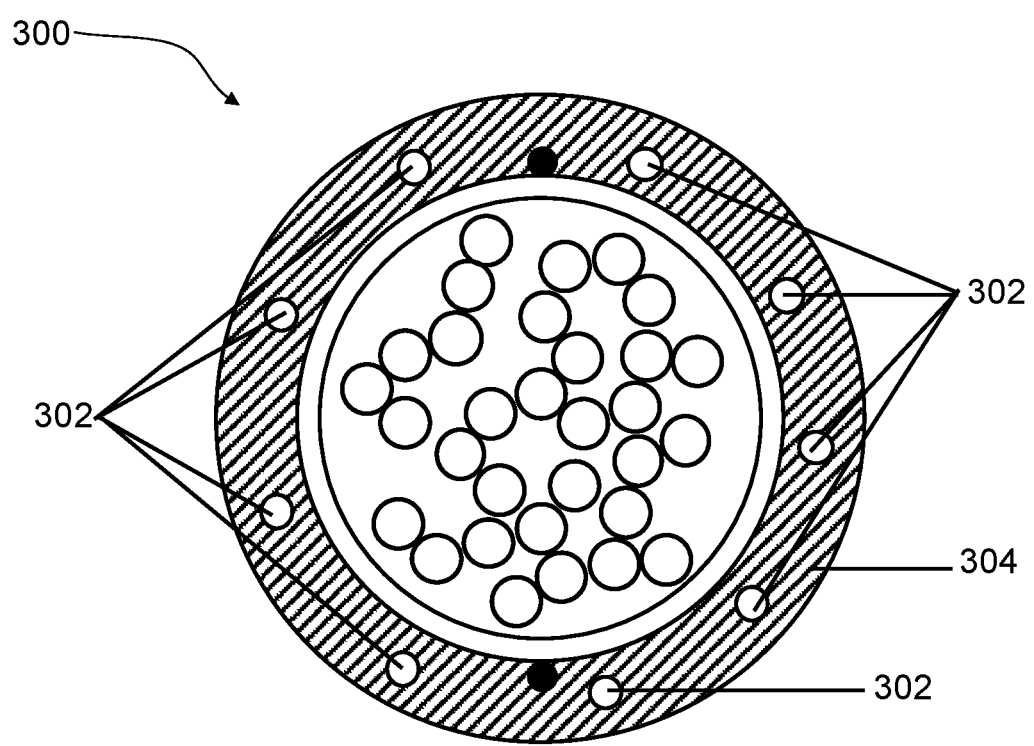
FIG. 3 illustrates an exemplary optical fiber cable with a plurality of strength members embedded in an outer layer.

The strength member may be an embedded strength member or central strength member of an optical fiber cable. FIG. 2 illustrates an exemplary optical fiber cable 200 with a central strength member 202 (Hereinafter "strength member") formed by above procedure. Similarly, FIG. 3 illustrates an exemplary optical fiber cable 300 with a plurality of strength members 302 (Hereinafter "strength member") embedded in an outer layer (sheath/jacket) 304. The sheath may be made from materials such as, but not limited to, polyvinylchloride, polyethylene (such as High Density Poly Ethylene (HDPE), Medium Density Poly Ethylene, and Low Density Poly Ethylene), polyurethane, thermoplastic rubber/elastomer, thermoplastic chlorinated polyethylene, Low Smoke Zero Halogen (LSZH) or combination thereof.

The strength member may provide mechanical strength, rigidity and stiffness to the optical fiber cable. The strength member may provide enhanced break load and excellent crush protection/resistance performance. The crush resistance is an ability of a cable to withstand and/or recover from the effects of a compressive force. The strength member may be made of, but not limited to, FRP (Fiber Reinforced Plastic), ARP (Aramid Reinforced Plastic) or any other suitable dielectric/strength material. The strength member may have a round shape, a flat shape or any other suitable shape.

Figure 4:
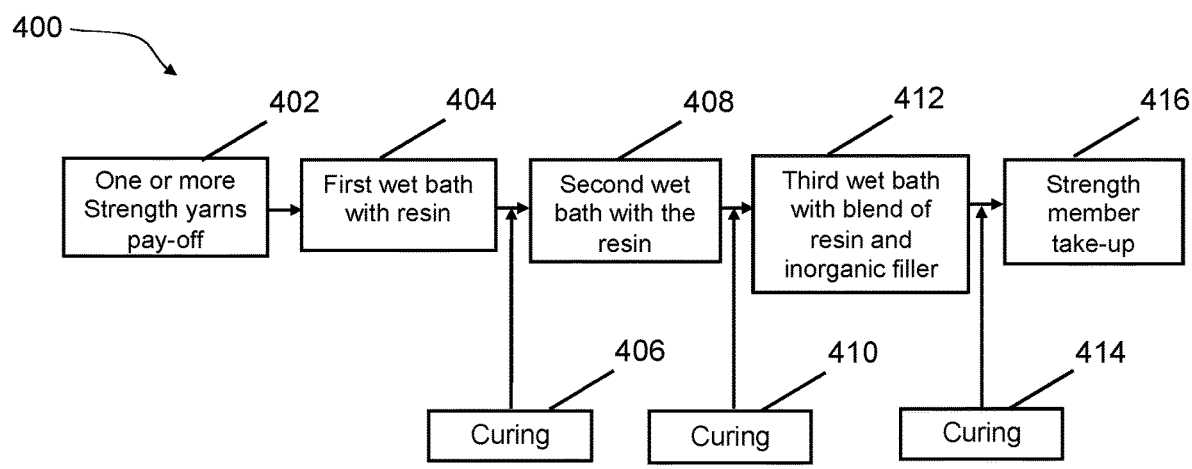
FIG. 4 is a flow chart illustrating a method for manufacturing the strength member.

FIG. 4 is a flow chart 400 illustrating a method for manufacturing the strength member. It may be noted that in order to explain the method steps of the flow chart 400, references will be made to the elements explained in FIG. 1.

At step 402, the pay-off unit 102 may continually pay-off the one or more strength yarns to the coating and curing unit 104. The coating and curing unit 104 may perform coating of the one or more strength yarns with the polymer matrix and curing of the polymer matrix. That is, from step 404 to step 414, the coating and curing unit 104 may be configured to perform coating and curing of the one or more strength yarns. At step 404, the one or more strength yarns may be wet bathed with the resin and at step 406, curing may be performed by the coating and curing unit 104 on the wet bathed one or more strength yarns. The above process of coating and curing may be repeated. That is, after a first round of bathing and curing, at step 408 and at step 410, the coating and curing unit 104 may perform a second round of wet bathing using the resin and curing of the one or more strength yarns respectively. At step 412 and at step 414, the coating and curing unit 104 may perform the curing followed by wet bathing of the bathed and cured one or more strength yarns with the blend of the resin and the inorganic filler.

Lastly, at step 416, the coated and cured strength member may be taken up by the take-up unit 106. The details of the resultant strength member is already explained in conjunction with FIG. 1, FIG. 2 and FIG. 3.

The various actions, acts, blocks, steps, or the like in the flow chart 400 may be performed in the order presented, in a different order or simultaneously. Further, in some implementations, some of the actions, acts, blocks, steps, or the like may be omitted, added, modified, skipped, or the like without departing from the scope of the present disclosure.

It will be apparent to those skilled in the art that other alternatives of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific aspect, method, and examples herein. The invention should therefore not be limited by the above described alternative, method, and examples, but by all aspects and methods within the scope of the invention. It is intended that the specification and examples be considered as exemplary, with the true scope of the invention being indicated by the claims.

Conditional language used herein, such as, among others, "can," "may," "might," "may," "e.g.," and the like, unless specifically stated otherwise, or otherwise understood within the context as used, is generally intended to convey that certain alternatives include, while other alternatives do not include, certain features, elements and/or steps. Thus, such conditional language is not generally intended to imply that features, elements and/or steps are in any way required for one or more alternatives or that one or more alternatives necessarily include logic for deciding, with or without other input or prompting, whether these features, elements and/or steps are included or are to be performed in any particular alternative. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain alternatives require at least one of X, at least one of Y, or at least one of Z to each be present.

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others.

I claim:

1. A strength member (202, 302) for use in an optical fiber cable, comprising:
   a polymer matrix reinforced with one or more yarns, wherein the polymer matrix is a blend of a resin and an inorganic filler, wherein the inorganic filler is one or more of Magnesium Hydroxide, Aluminium Trihydrate, Zinc borate, Antimony Trioxide, Ammonium Polyphosphate, molybdate based filler and clay nanocomposite;
   wherein the resin has a viscosity less than or equal to 200 mPa·s at 25° C.;
   whereby the strength member produces a smoke density of less than 170 at heat flux 50 kW/m2 for 20 minutes.

2. The strength member (202, 302) as claimed in claim 1, wherein the inorganic filler is blended with 1 to 100 phr (Parts per Hundred Resin) in the resin.

3. The strength member (202, 302) as claimed in claim 1, wherein the resin is a polyurethane resin.

4. The strength member (202, 302) as claimed in claim 1, wherein time of ignition for the strength member is up to 120 seconds at heat flux of 50 kW/m2.

5. The strength member (202, 302) as claimed in claim 1, wherein the strength member has a total heat release of less than 80 MJ/m2 at heat flux of 50 kW/m2.

6. The strength member (202, 302) as claimed in claim 1, wherein the inorganic filler has a particle size of greater than or equal to 0.25 micron.

7. The strength member (202, 302) as claimed in claim 1, wherein the inorganic filler has a temperature of decomposition less than or equal to 700° C.

8. The strength member (202, 302) as claimed in claim 1, wherein Magnesium Hydroxide and Aluminium Trihydrate are blended with a phr of 50 to 100 and Zinc borate, Antimony Trioxide, Ammonium Polyphosphate, molybdate based filler and clay nanocomposite are blended with a phr of 1 to 10 in the resin.

9. A method of manufacturing a strength member, comprising:
   coating one or more strength yarns with a polymer matrix; and
   curing of the polymer matrix; wherein the polymer matrix is a blend of a resin and an inorganic filler: wherein the inorganic filler is one or more of Magnesium Hydroxide, Aluminium Trihydrate, Zinc borate, Antimony Trioxide, Ammonium Polyphosphate, molybdate based filler and clay nanocomposite;

wherein the resin has a viscosity less than or equal to 200 mPa·s at 25° C.;

whereby the strength member produces a smoke density of less than 170 at heat flux 50 kW/m2 for 20 minutes.

10. The method as claimed in claim 9, wherein the resin is a polyurethane resin.

11. The method as claimed in claim 9, wherein the one or more strength yarns are one of aramid yarns and glass roving yarns.

12. The method as claimed in claim 9, wherein the inorganic filler is blended with 1 to 100 phr (Parts per Hundred Resin) in the resin.

13. The method as claimed in claim 9, wherein the inorganic filler is blended in third wet bath of the resin followed by two wet baths of the resin only.

14. The method as claimed in claim 13, wherein the resin is cured after each wet bath.

15. The method as claimed in claim 14, wherein the resin is cured by ultraviolet radiation or heat radiation.

\* \* \* \* \*